US007010974B2

(12) United States Patent
Spanke et al.

(10) Patent No.: US 7,010,974 B2
(45) Date of Patent: Mar. 14, 2006

(54) METHOD FOR MEASURING A FILL LEVEL

(75) Inventors: Dietmar Spanke, Steinen (DE); Manfred Eckert, Todtnau (DE); Stefan Maier, Rheinfelden (DE); Holger Steltner, Freiburg (DE)

(73) Assignee: Endress & Hauser GmbH & Co. KG, Maulburg (DE)

( * ) Notice: Subject to any disclaimer, the term of this patent is extended or adjusted under 35 U.S.C. 154(b) by 0 days.

(21) Appl. No.: 10/849,126

(22) Filed: May 20, 2004

(65) Prior Publication Data

US 2005/0092081 A1 May 5, 2005

(30) Foreign Application Priority Data

May 20, 2003 (DE) ............................... 103 23 063

(51) Int. Cl.
*G01F 23/296* (2006.01)
(52) U.S. Cl. ..................................... 73/290 V
(58) Field of Classification Search ............. 73/290 V
See application file for complete search history.

(56) References Cited

U.S. PATENT DOCUMENTS

| 4,661,817 | A | * | 4/1987 | Bekkadal et al. ........... 342/124 |
| 4,700,569 | A | * | 10/1987 | Michalski et al. ......... 73/290 V |
| 5,146,776 | A | * | 9/1992 | Twerdochlib et al. ........ 73/1.85 |
| 5,233,352 | A | * | 8/1993 | Cournane .................... 342/124 |
| 5,469,745 | A | * | 11/1995 | Twerdochlib ................ 73/660 |
| 6,044,703 | A | | 4/2000 | Fay et al. |

FOREIGN PATENT DOCUMENTS

| DE | 37 21 212 A1 | 5/1989 |
| DE | 42 33 257 C1 | 6/1993 |
| DE | 42 23 346 C2 | 1/1994 |
| DE | 44 12 900 C2 | 10/1995 |
| DE | 197 14 973 C2 | 10/1998 |

* cited by examiner

*Primary Examiner*—Hezron Williams
*Assistant Examiner*—Paul M. West
(74) *Attorney, Agent, or Firm*—Bacon & Thomas

(57) ABSTRACT

A method for a fill level measurement in accordance with the running time principle, which functions dependably over a long period of time, is provided, having a fill level measuring device with an ultrasonic sensor for transmitting and receiving ultrasound, wherein a repeated check of a resonance frequency of the ultrasonic sensor is performed, in the course of which the ultrasonic sensor is briefly excited to oscillate, following the excitation a signal received by the ultrasonic sensor is picked up, and the actual resonance frequency of the ultrasonic sensor is determined by means of the received signal in that the received signal is digitized and supplied to a digital signal processor, a Fourier transformation of the digitized received signal is performed in the signal processor, a maximum of the Fourier-transformed received signal is determined as a function of the frequency, a frequency at which the maximum occurs is stored as the actual resonance frequency, and during measuring operations the ultrasonic sensor is excited by the digital signal processor by means of the last determined actual resonance frequency.

9 Claims, 3 Drawing Sheets

METHOD FOR MEASURING A FILL LEVEL

FIELD OF THE INVENTION

The invention relates to a method for measuring a fill level in accordance with the running time principle, having a fill level measuring device with an ultrasonic sensor for transmitting and receiving ultrasound.

BACKGROUND OF THE INVENTION

It is possible, inter alia, to measure fill levels of a filler material in a container or an open raceway, for example, by means of such fill level measuring devices. In the process, a signal transmitted by an ultrasonic sensor, for example a brief ultrasonic pulse, is sent in the direction toward the filler material and is reflected at the surface of the filler material. The running time of the pulse from the sensor to the surface and its return is measured, and the fill level or the height of the filler is determined from this.

Such measuring apparatus is employed in many branches of industry, for example in the food industry, the water or waste water fields, and in chemistry.

For achieving as high as possible a transmission output of the ultrasonic sensor, the latter is preferably excited by means of its resonance frequency. As a rule, the resonance frequency is determined ahead of time, and thereafter the ultrasonic sensor is excited by means of this resonance frequency. However, the resonance frequency is not a constant value. For example, it is a function of the temperature of the surroundings of the ultrasonic sensor. Added to this is that, in case of industrial applications, media whose fill level is intended to be measured, can be deposited on the ultrasonic sensor. Such a deposit represents a mass, which is moved along by means of the oscillations of the ultrasonic sensor, and can therefore also result in changes in the resonance frequency.

Thus, in conventional fill level measuring devices the resonance frequency of the ultrasonic sensor is first measured at different temperatures and is stored in the device. The fill level measuring device is equipped with a temperature sensor, which is used to detect the actual temperature of the ultrasonic sensor. The resonance frequency assigned to the actual temperature is selected from the stored resonance frequencies on the basis of the actual temperature, and the ultrasonic sensor is excited by means of this frequency during the transmitting operation. This involves an additional outlay.

A possible change because of the formation of deposits is not detected by this.

In some applications it is possible, for example when a container is overfilled, that the ultrasonic sensor dips into the medium.

A method for measuring a fill level is described in DE-C 197 14 973 wherein it is determined by means of a post-pulse oscillation behavior of the ultrasonic sensor, whether the ultrasonic sensor is covered by the filler material.

If the ultrasonic sensor is covered by the filler material, no fill level measurement is possible anymore by means of conventional fill level measuring methods.

SUMMARY OF THE INVENTION

It is therefore the object of the invention to disclose a method for measuring the fill level, which operates dependably over long periods of time.

In accordance with the invention this object is attained by means of the characteristics of claim 1. Advantageous further developments are represented in the dependent claims.

To this end the invention consists of a method for fill level measurement in accordance with the running time principle, having a fill level measuring device with an ultrasonic sensor for transmitting and receiving ultrasound, wherein
- a repeated check of a resonance frequency of the ultrasonic sensor is performed, in the course of which
  - the ultrasonic sensor is briefly excited to oscillate,
  - following the excitation a signal received by the ultrasonic sensor is picked up, and
  - the actual resonance frequency of the ultrasonic sensor is determined by means of the received signal in that
    - the received signal is digitized and supplied to a digital signal processor,
      - a Fourier transformation of the digitized received signal is performed in the signal processor,
      - a maximum of the Fourier-transformed received signal is determined as a function of the frequency,
      - a frequency at which the maximum occurs is stored as the actual resonance frequency, and
- during measuring operations the ultrasonic sensor is excited by the digital signal processor by means of the last determined actual resonance frequency.

In accordance with one embodiment of the invention
a temperature of the ultrasonic sensor is measured during the check,
a difference between the actual resonance frequency and a temperature-dependent reference variable of the resonance frequency is determined,
a warning is issued, if the difference is greater than a preselected minimum value.

In accordance with a further embodiment of the method
a difference between the actual resonance frequency and a preselected reference value is determined in the course of the check, and
an alarm is triggered, if the difference exceeds a preselected maximum value.

In accordance with a further development of the method
a temperature of the ultrasonic sensor is measured in the course of the check,
a difference between the actual resonance frequency and a temperature-dependent reference variable of the resonance frequency is determined, and
if the difference is greater than a preselected threshold value, self-cleaning of the ultrasonic sensor is triggered.

In accordance with an embodiment of the last-mentioned method, the ultrasonic sensor is exited to perform energy-rich oscillations during self-cleaning.

In accordance with a further embodiment of the method, the actual reference frequencies are stored in a memory, and an evaluation of the ultrasonic sensor is performed by means of the chronological changes of the resonance frequency of the ultrasonic sensor.

In accordance with a further development of the method it is determined by means of the actual resonance frequency whether the ultrasonic sensor is covered by filler material.

In accordance with a further development of the last mentioned further development, the fill level measuring device determines the fill level on the basis of a running time of a signal which, transmitted by the ultrasonic sensor, is reflected at a bottom of a container in which the filler material is located, thereafter is reflected at the surface of the filler material, after that is again reflected at the bottom, and then is received again by the ultrasonic sensor if the ultrasonic sensor is covered by filler material.

In accordance with another further development, the fill state measuring device determines, in case the ultrasonic sensor is covered by filler material, a thickness of a deposit at the bottom of the container by determining a running time of a signal from the ultrasonic sensor to the deposit and back again.

The invention and further advantages will now be explained in greater detail by means of the drawing figures, in which an exemplary embodiment is represented. Identical elements are provided with identical reference symbols in the drawings.

Figure 1:
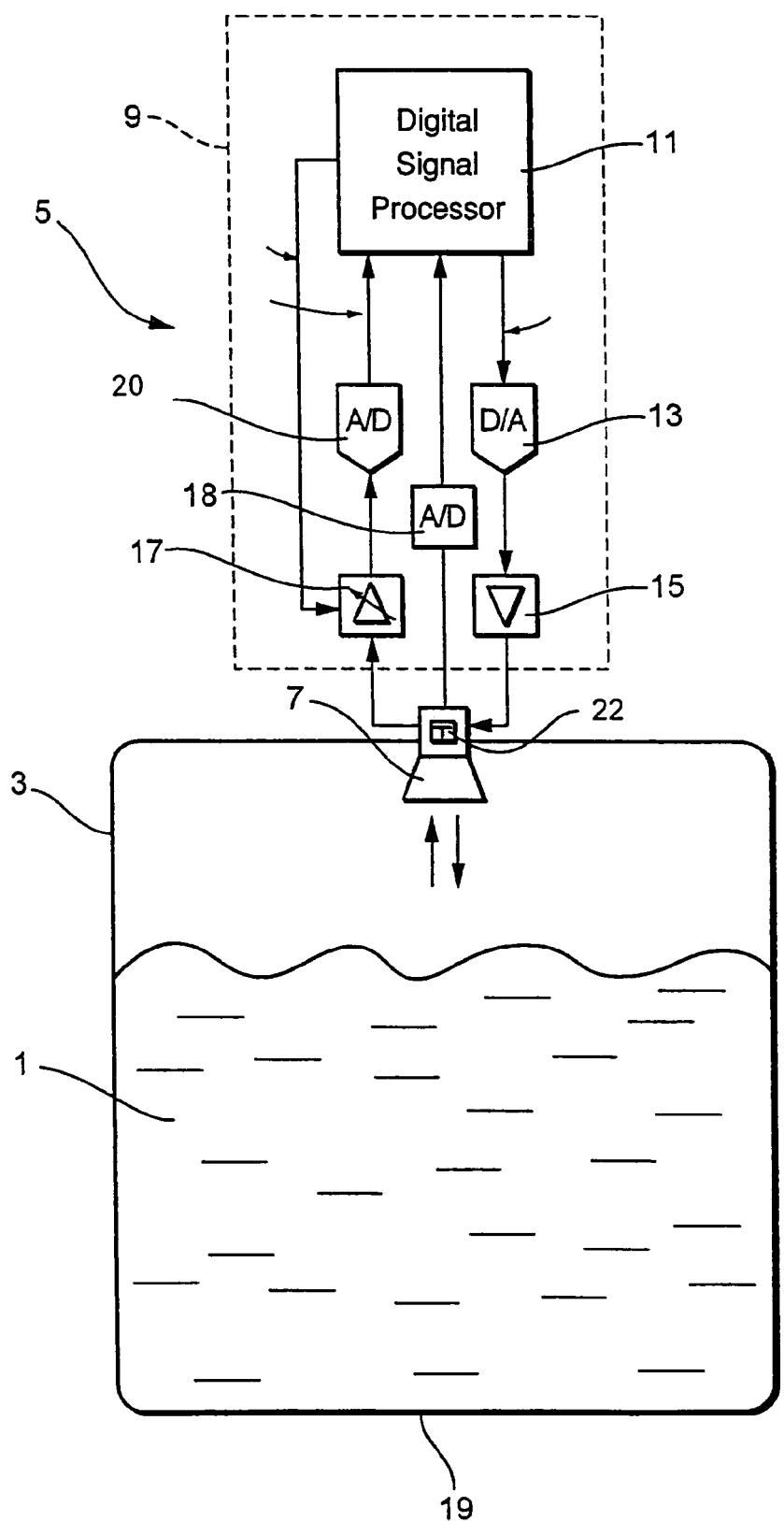
FIG. 1 shows an arrangement for fill level measuring.

A device for measuring a fill level is represented in FIG. 1. A container 3, filled with filler material 1, is represented, on which a fill level measuring device 5 operating in accordance with the running time principle and having an ultrasonic sensor 7 is arranged.

DESCRIPTION OF THE PREFERRED EMBODIMENT

A cup-shaped housing, which is closed off at the bottom, is suitable as an ultrasonic sensor 7, for example.

The housing is made of a plastic material, for example polypropylene. A piezo-electric element, which is used for transmitting and receiving ultrasonic signals through the bottom, is arranged in the housing.

Since the acoustic impedance of the medium into which the ultrasound is to be transmitted, for example air, and that of the piezo-electric element differ greatly, an adapter layer made of a plastic material of average acoustic impedance is preferably arranged between the piezo-electric element and the bottom of the housing. Epoxy resin, for example, is used as the plastic material.

In order to achieve as good as possible an adaptation, and thereby the highest possible acoustic pressure, the adapter layer preferably has a thickness corresponding to a quarter of the wave length of the generated acoustic or ultrasonic waves.

In connection with an ultrasonic sensor employed not only as a transmitter, but also as a receiver, it is important that a transmitted oscillation, once excited, dies out rapidly. The ultrasonic sensor is only ready to receive after the transmitted oscillation has completely died out. Therefore a damping material is provided for achieving the rapid dying out of the transmitted oscillation. The damping material is, for example, a cast material, for example a silicon gel, which fills the housing.

The fill level measuring device 5 has a transmitting and receiving circuit 9, which is used to excite the ultrasonic sensor 7 to transmit ultrasonic signals and to take in ultrasonic signals received from the ultrasonic sensor 7 and to pass them on for further processing and/or evaluation.

The heart of the transmitting and receiving circuit 9 in the exemplary embodiment represented is a digital signal processor 11. The digital signal processor 11 is connected with the ultrasonic sensor 7 via a digital/analog converter 13 and an amplifier 15. The digital signal processor 11 can generate digital signals, which are converted into analog signals in the digital/analog converter 13 and, amplified by the amplifier 15, are available in an analog form at the ultrasonic sensor 7. The analog signals are supplied to an electrode which, for example, is attached to the piezo-electric element. The piezo-electric element is caused to oscillate by the supplied signals and transmits ultrasonic signals corresponding to this excitation through the bottom in the direction toward the filler material.

The transmitted ultrasonic signals are reflected at the surface of the filler material, and the echo signals from there are received by the ultrasonic sensor 7. In the course of this the piezo-electric element is caused to oscillate, which oscillations can be picked up as received signals in the form of electrical alternating signals at the electrode. The received signals are amplified by the amplifier 17 and are conducted to an analog/digital converter 20, which digitizes the arriving signals and supplies them to the digital signal processor 11.

If ultrasonic signals, such as are customarily employed in ultrasonic measuring technology, are transmitted and/or received in the range of 1 kHz to 200 kHz, it is possible to employ commercially available analog/digital converters and digital/analog converters with scanning rates of approximately 1 MHz. Digital signal processors with clock rates of several gigahertz are commercially available and operate sufficiently fast for not only making available signals for the excitation of the ultrasonic sensor 7, but also for being able to directly record and process the oscillation behavior of the ultrasonic sensor.

For example, for measuring the fill level, a brief ultrasonic wave pulse is generated in the manner described above, which is transmitted in the direction toward the filler material. After a running time which is a function of the fill level, its echo signal is received and is evaluated by means of the digital signal processor 11.

For achieving as high a possible a transmission output, and therefore also a large output of the received signals, the excitation is preferably provided with the resonance frequency of the ultrasonic sensor 7.

However, the resonance frequency of the ultrasonic sensor 7 is not a constant value, but changes with the temperature and other extraneous influences.

Therefore, in accordance with the invention, a repeated check of the resonance frequency of the ultrasonic sensor 7 is performed. In the course of this, the ultrasonic sensor 7 is briefly excited to oscillate. Following the excitation, a signal received by the ultrasonic sensor is picked up, by means of which the actual resonance frequency of the ultrasonic sensor 7 is determined.

Ultrasonic sensors are oscillation-capable damped systems, whose oscillation properties are substantially determined by their quality Q and a natural frequency $f_0$ of the corresponding undamped system.

If the ultrasonic sensor 7, or more correctly the piezo-electric element, is caused to oscillate by means of a signal S of the form $$S = A_s \cos(2 \pi f t)$$

wherein

A$_s$ is the amplitude of the excitation, f is the frequency of the excitation, and t is the time, following its settling process, the ultrasonic sensor performs a forced oscillation of the form $$x(t) = A(A_s, f, f_0, Q) \cos(2\pi f t - \text{alpha}(f, f_0, Q)),$$

wherein

A(A$_s$, f, f$_0$, Q) means the amplitude of the forced oscillation, which is a function of the amplitude A$_s$ of the excitation, the natural frequency f$_0$, and the quality Q of the system, and alpha(f, f$_0$, Q) means the phase, which is a function of the amplitude A$_s$ of the excitation, the natural frequency f$_0$, and the quality Q of the system.

The amplitude A(A$_s$, f, f$_0$, Q) of the forced oscillation is maximal, if excitation is performed at the resonance frequency f$_{res}$, which is determined in accordance with the equation below from the natural frequency f$_0$ and the quality Q:

$$f_{res} = f_0(1 - \tfrac{1}{2}Q^2)^{1/2}.$$

If the excitation is stopped at a time t$_0$, the damped system decays in accordance with the following equation:

$$x_d(t) = e^{-(t-t0)/\text{tau}} A(A_s, f, f_0, Q)\cos(2\pi f_d(t-t_0) - \text{alpha}_d)$$

wherein tau=Q/(pi f$_0$) means the decay time, f$_d$=f$_0$(1−¼Q$^2$)$^{1/2}$ the frequency, and alpha$_d$ a phase, which is a function of the initial conditions.

The frequency f$_d$ of the after-oscillation is almost identical to the resonance frequency f$_{res}$ of the ultrasonic sensor 7.

The following applies:

$$f_{res}/f_d = [(1 - \tfrac{1}{4}Q^2 - 1)]^{1/2}.$$

The quality Q of commercially available ultrasonic sensors 7 used for fill level measuring customarily is greater than or equal to twenty. With quality Q≧20, the following applies:

$$1 \geq f_{res}/f_d \geq 0.9997.$$

This small difference is unimportant for the method here described. The frequency of the after-oscillation f$_d$ here corresponds to the resonance frequency f$_{res}$.

Accordingly, it is possible by means of the oscillation behavior of the ultrasonic sensor 7 following the brief excitation to determine its actual resonance frequency.

Figure 2:
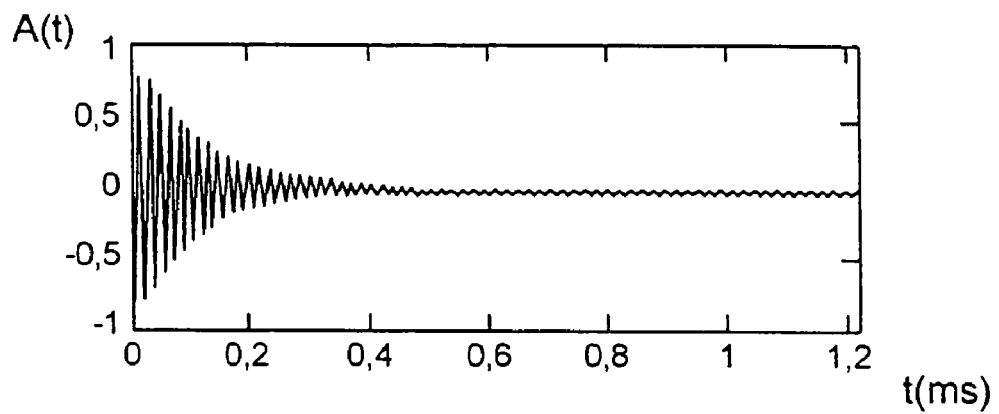
FIG. 2 shows an amplitude of a received signal subsequently to an excitation as a function of time.
Figure 3:
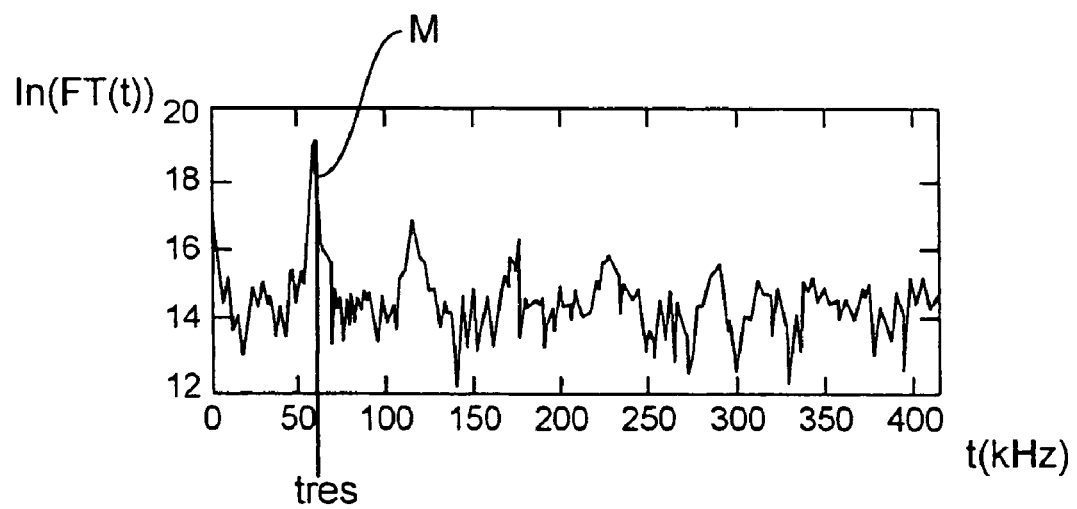
FIG. 3 shows a logarithmic value of a Fourier transformation of the received signal in FIG. 2 as a function of the frequency.

For determining the actual resonance frequency, the ultrasonic sensor 7 is briefly excited to oscillate at any arbitrary frequency f and any arbitrary amplitude As, and a signal received from by ultrasonic sensor 7 subsequent to this excitation is recorded. FIG. 2 shows an example for an amplitude A(t) of the received signal following the excitation over the time t. The received signal is amplified and digitized and is conducted to the digital signal processor 11. A Fourier transformation of the amplified digitized received signal is performed in the digital signal processor 11. A logarithmic value ln (|FT(A)[f]|) of the Fourier-transformed received signal FT(A) is applied over the frequency f. The value shows a definite maximum M. The associated frequency f$_{res}$ corresponds to the actual resonance frequency of the ultrasonic sensor 7. Thus, the actual resonance frequency can be determined in a simple manner by a determination of the absolute maximum M of the Fourier-transformed received signal.

The frequency at which the maximum occurs is determined by means of the digital signal processor 11 and is stored as the actual resonance frequency.

In the course of the following measuring operation the ultrasonic sensor 7 is excited by the digital signal processor 11 with the last determined actual resonance frequency. The excitation with the resonance frequency is performed with the described fill level measuring device 5, for example, by means of suitable software, which generates digital signals with the actual resonance frequency. Appropriate programs are stored, for example, in a memory not represented in FIG. 1, of the fill level measuring device 5. The digital signal processor 11 generates digital signals with the resonance frequency by means of these programs, which can then be supplied via the digital/analog converter 13 and the amplifier 15 to the ultrasonic sensor 7.

Transmitting, receiving and checking of the resonance frequency are substantially performed by the digital signal processor 11. No elaborate analog circuits, in particular no control circuits, are required for setting the resonance frequency.

It is assured by the repeated checking of the resonance frequency, that the ultrasonic sensor 7 is still excited with its resonance frequency, even if the latter is changed over long periods of time, for example by deposits, or by changes in the ambient temperature. Neither additional components, nor separate sensors, for example temperature sensors, are required for this.

It is assured by means of the repeated checking of the resonance frequency and the updating of the transmission frequency that during measuring operations the ultrasonic sensor 7 always transmits with its maximum transmitting output. A high transmission output offers the advantage that the echo signals of highly energetic transmission signals also have a high signal amplitude. The accuracy with which a running time of these signals to the filler material surface and back can be determined is improved by this. Maxima of the echo signals based on a reflection at the filler material surface, and therefore also an associated running time, can be determined more accurately and unambiguously, because at high transmission outputs the signals clearly differ from background noise. During reception, the sensitivity of the ultrasonic sensor 7 is greatest to such signals, whose frequency corresponds to the actual resonance frequency.

The repeated check of the resonance frequency can take place, for example, at regular chronological intervals, for example following a preset number of measuring cycles, or prior to each measurement.

If the temperature of the ultrasonic sensor 7 is measured in addition to the repeated check of the resonance frequency, important information regarding the status of the ultrasonic sensor 7 can be derived from this. To this end, a temperature sensor 17 is preferably integrated into the ultrasonic sensor 7. A measuring signal from the temperature sensor 22 is preferably digitized by means of an analog/digital converter 18 and is conducted to the signal processor 11.

By means of the temperature of the ultrasonic sensor 7 and of the actual resonance frequency determined by checking it is possible, for example, to determine whether deposits have formed on the ultrasonic sensor 7.

The resonance frequency of the ultrasonic sensor 7 is temperature-dependent. At a defined temperature, the resonance frequency of an ultrasonic sensor 7 free of deposits has a set point which is temperature-dependent. To start with, a corresponding characteristic line, or its parametric form, which represents the dependency of the resonance frequency of the ultrasonic sensor 7 free of deposits on the temperature, is preferably recorded and stored in a memory of the fill level measuring device 5.

The actual resonance frequencies are determined and the temperature is measured. By means of the temperature the digital signal processor determines the associated temperature-dependent set point of the resonance frequency from the characteristic line. Thereafter a difference between the actual resonance frequency and the temperature-dependent set point of the resonance frequency is determined.

If the difference is greater than a preset minimum value, the oscillation properties of the ultrasonic sensor 7 have changed. Preferably the minimum value corresponds to a deviation which can also be a function of tolerances and measurement inaccuracies, for example.

If the difference is greater than the preset minimum value, a warning is preferably issued. Depending on the application, the warning can be designed in different ways. For example, it can be given by means of a light-emitting diode provided at the fill level measuring device 5, can be issued in the form of an electrical signal, or transmitted by digital communications.

If the difference is greater that the preset maximum value, an alarm is preferably issued. A value is preferably preset, in connection with which it can be assumed that, because of the large changes of the oscillation properties, no meaningful fill level measurement is possible anymore. The same as the warning, the alarm can be displayed by means of a light-emitting diode provided at the fill level measuring device 5, can be issued in the form of an electrical signal, or transmitted by digital communications.

Self-cleaning of the ultrasound sensor 7 is preferably triggered if the difference exceeds a preset threshold value. The preset threshold value is greater than or equal to the minimum value. The value to be assigned to the threshold value depends on the fields in which the fill level measuring device 5 is intended to be employed. Depending on the application it can be more advantageous to trigger frequent cleaning by setting a low threshold value, wherein any formation of deposits is removed after a short period of time, or to trigger the cleaning less frequently by setting a high threshold value, therefore being able to perform fill level measurements over comparatively long periods of time without interruptions.

Self-cleaning of the ultrasonic sensor 7 preferably takes place by exciting the ultrasonic sensor 7 to energy-rich oscillations. The deposit is shaken off by energy-rich oscillations.

In the exemplary embodiment described, self-cleaning can be triggered by the digital signal processor, as well as performed by emitting appropriate digital signals.

The actual resonance frequencies determined during the checks are preferably stored in a memory, and an evaluation of the ultrasonic sensor is performed by means of a chronological change of the resonance frequency of the ultrasonic sensor. In this case the evaluations can be performed in a variety of ways.

For example, a resonance frequency which remains unchanged over a long period of time can be interpreted in such a way that the ultrasonic sensor 7 functions perfectly. This interpretation can be used, for example, for avoiding maintenance or cleaning of the ultrasonic sensor 7, which would be per se unnecessary.

Furthermore, a steady drop of the resonance frequency over time can be interpreted as a layer, which grows over time, being deposited on the ultrasonic sensor 7. By means of the speed with which the resonance frequency changes it is possible to estimate when cleaning of the ultrasonic sensor 7 will become necessary.

In the same way it is possible to detect brief, drastic, for example sudden, changes of the resonance frequency. In this connection it is sufficient, as a rule, to only store the actual and the previous values of the resonance frequency.

A sudden change of the resonance frequency occurs, for example, if the ultrasonic sensor 7 is suddenly mechanically damaged.

A check of the resonance frequency can additionally be used for determining by means of the actual resonance frequency whether the ultrasonic sensor 7 is covered by filler material 1. In the process use is made of the fact that the resonance frequencies of an ultrasonic sensor 7 covered by filler material 1 clearly differ from the resonance frequencies of the same ultrasonic sensor 7 in air or a gas. If the filler material 1 is known, it is additionally possible to initially determine the resonance frequency of the ultrasonic sensor 7 in this medium and to store it in a memory of the fill level measuring device 5. If the filler material 1 is unknown, it is possible to initially determine frequency intervals of the resonance frequency of the ultrasonic sensor 7 covered with filler material 1, within which the resonance frequency of the ultrasonic sensor 7 is to be expected when the ultrasonic sensor 7 dips into the filler material 1. By means of a simple comparison of the actual resonance frequency with the above mentioned frequencies to be expected in case of coverage it is determined whether the ultrasonic sensor 7 has been submerged into the filler material.

If the ultrasonic sensor 7 has dipped into the filler material 1, it is possible by means of the method described in what follows to determine the fill level even with the ultrasonic sensor 7 being submerged.

Figure 4:
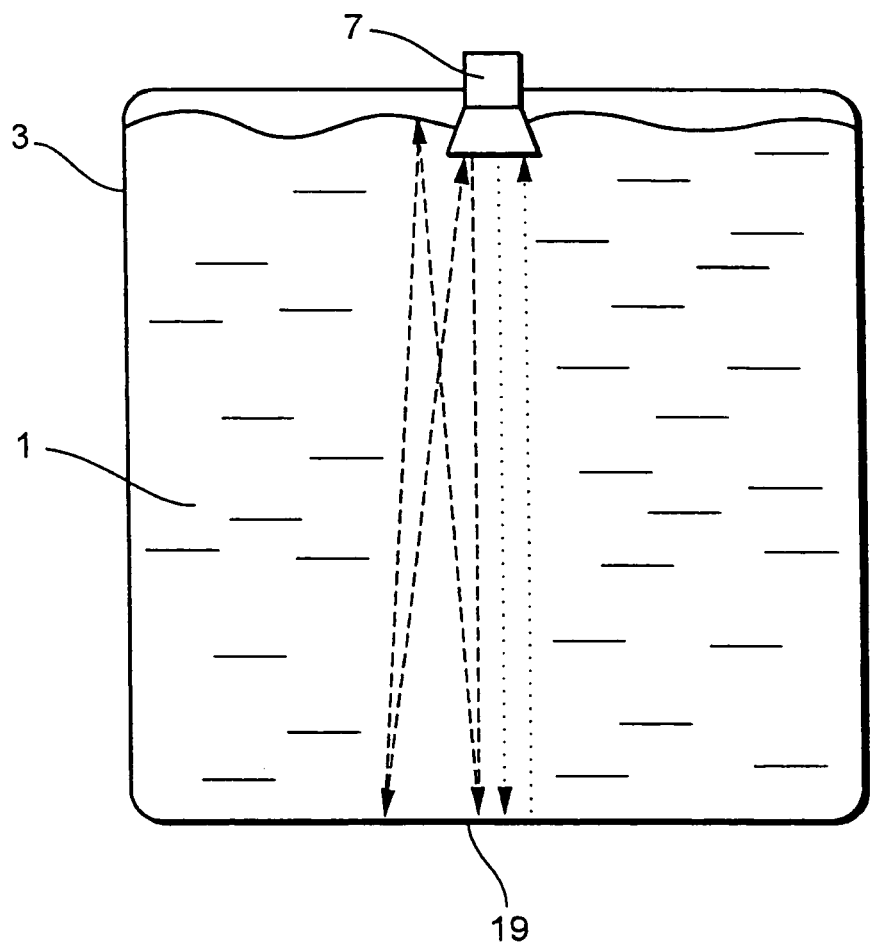
FIG. 4 shows the paths traveled by an ultrasonic signal when the ultrasonic sensor has dipped into the filler material.

For this purpose a running time of a signal in case of a coverage is determined, which has been transmitted by the ultrasonic sensor 7, has been reflected at a bottom 19 of the container 3, in which the filler material 1 is located, is then reflected at the surface of the filler material 1, thereafter is again reflected at the bottom 19 and is received again by the ultrasonic sensor 7. The path traveled by this signal is represented by dashed arrows in FIG. 4.

Figure 5:
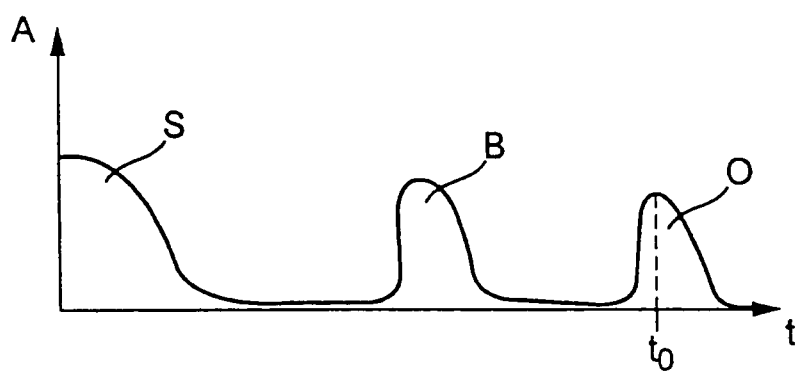
FIG. 5 shows an amplitude of a received signal as a function of time when the ultrasonic sensor is covered by the filler material.

FIG. 5 shows the amplitude of a signal received from an ultrasonic sensor 7 dipped into the filler material 1 as a function over time. The amplitude has three maxima S, B and O. The first maximum S is the result of a transmission of a brief ultrasonic signal. The second maximum B is generated by a portion of the transmitted ultrasonic signal which was reflected at the bottom 19 directly to the ultrasonic sensor 7. An associated signal path is indicated by a dotted line in FIG. 4. The third maximum O is the result of a portion of the transmitted ultrasonic signal which has traveled the path drawn as a dashed line in FIG. 4. In the course of the fill level measurement, the maximum O and the associated running time $t_O$ are first determined.

The fill level L is determined by means of the running time $t_O$, the propagation speed v of the ultrasonic signal in the filler material 1, and a distance UB between the ultrasonic sensor 7 and the bottom 19, in accordance with the equation:

$$L = \tfrac{1}{2} v \, t - UB.$$

In case of a covered ultrasonic sensor 7 it is alternatively possible to determine a thickness d of a deposit on the bottom 19 of the container 3.

For this purpose an ultrasonic signal is transmitted in the direction toward the bottom 19, and its echo is recorded. The ultrasonic signal is reflected at the surface of the deposit back to the ultrasonic sensor 7. Therefore the received signal has a maximum, whose running time $t_A$ is proportional to twice the path length from the ultrasonic sensor 7 to the surface of the deposit. The proportional value is equal to the reciprocal value of the propagation speed of the ultrasound in the filler material 1.

Thus, the running time $t_A$ is determined for determining the thickness d of the deposit located on the bottom 19 of the container 3.

The thickness d of the deposit is determined from the length of the running time $t_A$ in accordance with the equation:

$$d = UB - \tfrac{1}{2} v \, t_A,$$

wherein
- d is the thickness,
- UB is the distance between the ultrasonic sensor and the bottom,
- v is the propagation speed of the ultrasonic signal in the filler material, and
- $t_a$ is the running time of the ultrasonic signal from the ultrasonic sensor 7 to the surface of the deposit and back.

What is claimed is:

1. A method for measuring a fill level in accordance with the running time principle, having a fill level measuring device with an ultrasonic sensor consisting of a piezoelectric element in a housing for transmitting and receiving ultrasound, the method comprising the steps of:
    performing a repeated check of a resonance frequency of the ultrasonic sensor in the course of which the ultrasonic sensor is briefly excited to oscillate, following the excitation a signal received by the ultrasonic sensor is picked up, and the actual resonance frequency of the ultrasonic sensor is determined by means of the received signal, the received signal is digitized and supplied to a digital signal processor, a Fourier transformation of the digitized received signal is performed in the signal processor, a maximum of the Fourier-transformed received signal is determined as a function of the frequency, and a frequency at which the maximum occurs is stored as the actual resonance frequency; and
    exciting the ultrasonic sensor during measuring operations by the digital signal processor by means of the last determined actual resonance frequency for an as high as possible transmission output of the signal, and the transmitted ultrasonic signals are reflected after a running time which is a function of the fill level and the echo signals from the fill level are received by the ultrasonic sensor.

2. The method in accordance with claim 1, wherein:
    a temperature of the ultrasonic sensor is measured during the check,
    a difference between the actual resonance frequency and a temperature-dependent reference variable of the resonance frequency is determined, and
    a warning is issued, if the difference is greater than a preselected minimum value.

3. The method in accordance with claim 1, wherein:
    a difference between the actual resonance frequency and a preselected reference value is determined, and
    an alarm is triggered, if the difference exceeds a preselected maximum value.

4. The method in accordance with claim 1, wherein:
    a temperature of the ultrasonic sensor is measured in the course of the check,
    a difference between the actual resonance frequency and a temperature-dependent reference variable of the resonance frequency is determined, and
    if the difference is greater than a preselected threshold value, self-cleaning the ultrasonic sensor is triggered.

5. The method in accordance with claim 4, wherein:
    the ultrasonic sensor is exited to perform energy-rich oscillations during self-cleaning.

6. The method in accordance with claim 1, wherein:
    the actual reference frequencies are stored in a memory, and
    an evaluation of the ultrasonic sensor is performed by means of the chronological changes of the resonance frequency of the ultrasonic sensor.

7. The method in accordance with claim 1, wherein:
    it is determined by means of the actual resonance frequency whether the ultrasonic sensor is covered by filler material.

8. The method in accordance with claim 7, wherein:
    the fill level measuring device determines the fill level on the basis of a running time ($t_O$) of a signal which, transmitted by the ultrasonic sensor, is reflected at a bottom of a container in which the filler material is located, thereafter is reflected at the surface of the filler material, after that is again reflected at the bottom, and then is received again by the ultrasonic sensor, if the ultrasonic sensor is covered by filler material.

9. The method in accordance with claim 7, wherein:
    the fill state measuring device determines, in case the ultrasonic sensor is covered by filler material, a thickness (d) of a deposit at the bottom of the container by determining a running time of a signal from the ultrasonic sensor to the deposit and back again.

* * * * *